US011546458B2

(12) United States Patent
Delaney et al.

(10) Patent No.: US 11,546,458 B2
(45) Date of Patent: Jan. 3, 2023

(54) ORGANIZING APPLICATIONS FOR MOBILE DEVICES

(71) Applicant: Micron Technology, Inc., Boise, ID (US)

(72) Inventors: Claudia A. Delaney, Boise, ID (US); Bhumika Chhabra, Boise, ID (US); Elsie de la Garza Villarreal, Nampa, ID (US); Madison E. Wale, Garden City, ID (US)

(73) Assignee: Micron Technology, Inc., Boise, ID (US)

( * ) Notice: Subject to any disclaimer, the term of this patent is extended or adjusted under 35 U.S.C. 154(b) by 265 days.

(21) Appl. No.: 16/898,292

(22) Filed: Jun. 10, 2020

(65) Prior Publication Data

US 2021/0392225 A1 Dec. 16, 2021

(51) Int. Cl.
*H04M 1/72* (2021.01)
*H04M 1/72454* (2021.01)
*G06F 3/0482* (2013.01)
*G06F 3/04817* (2022.01)

(52) U.S. Cl.
CPC ...... *H04M 1/72454* (2021.01); *G06F 3/0482* (2013.01); *G06F 3/04817* (2013.01)

(58) Field of Classification Search
CPC ............ H04M 1/72454; G06F 3/04817; G06F 3/0482
See application file for complete search history.

(56) References Cited

U.S. PATENT DOCUMENTS

2017/0235439 A1* 8/2017 Lu ................. G06F 3/04842
715/812
2018/0284970 A1* 10/2018 Sudo ................ G06F 1/1643

FOREIGN PATENT DOCUMENTS

| KR | 101233955 B1 | 2/2013 |
| KR | 20130020213 A | 2/2013 |
| KR | 101346931 B1 | 1/2014 |
| KR | 20160032565 A | 3/2016 |

OTHER PUBLICATIONS

International Search Report and Written Opinion dated Sep. 7, 2021 for International Patent Application No. PCT/US2021/032907, 9 pages.

* cited by examiner

*Primary Examiner* — Curtis B Odom
(74) *Attorney, Agent, or Firm* — Perkins Coie LLP

(57) ABSTRACT

Methods and apparatuses for arranging applications for a mobile device are described, in which the mobile device includes a set of applications. The mobile device may identify certain applications that a user of the mobile device is likely to activate, based on a particular environmental setting. The environmental setting may include a present location determined by a GPS, a present date and time, a present day, or the like. The mobile device may display graphical elements (e.g., icons) corresponding to the identified applications on a screen of the mobile device such that the user may conveniently activate the identified applications. In some embodiments, the mobile device may sort individual applications of the set based on quantities and/or lengths of activations to identify such applications. The mobile device may enlarge the icons by a predetermined factor before displaying them on the screen.

16 Claims, 5 Drawing Sheets

ORGANIZING APPLICATIONS FOR MOBILE DEVICES

TECHNICAL FIELD

The present disclosure generally relates to mobile devices, and more particularly relates to organizing applications for mobile devices.

BACKGROUND

Mobile devices (e.g., cellular phones) are widely deployed to help users in various environments. The users may select icons for certain applications from their default locations (e.g., default screens for the applications to appear without the users' manipulation) to a screen convenient for them such that the users can readily access the selected applications. The icons, however, may be placed back to their default locations after certain events for the mobile device—e.g., following an operating system update, after downloading a new application, etc. Such default locations may require the users to search across several screens to locate the icons, and to engage in repetitive and tedious efforts to relocate the selected applications to where the users want them to be, a task which can be especially difficult for users with visual, motor, and/or other physical challenges.

DETAILED DESCRIPTION

Figure 1:
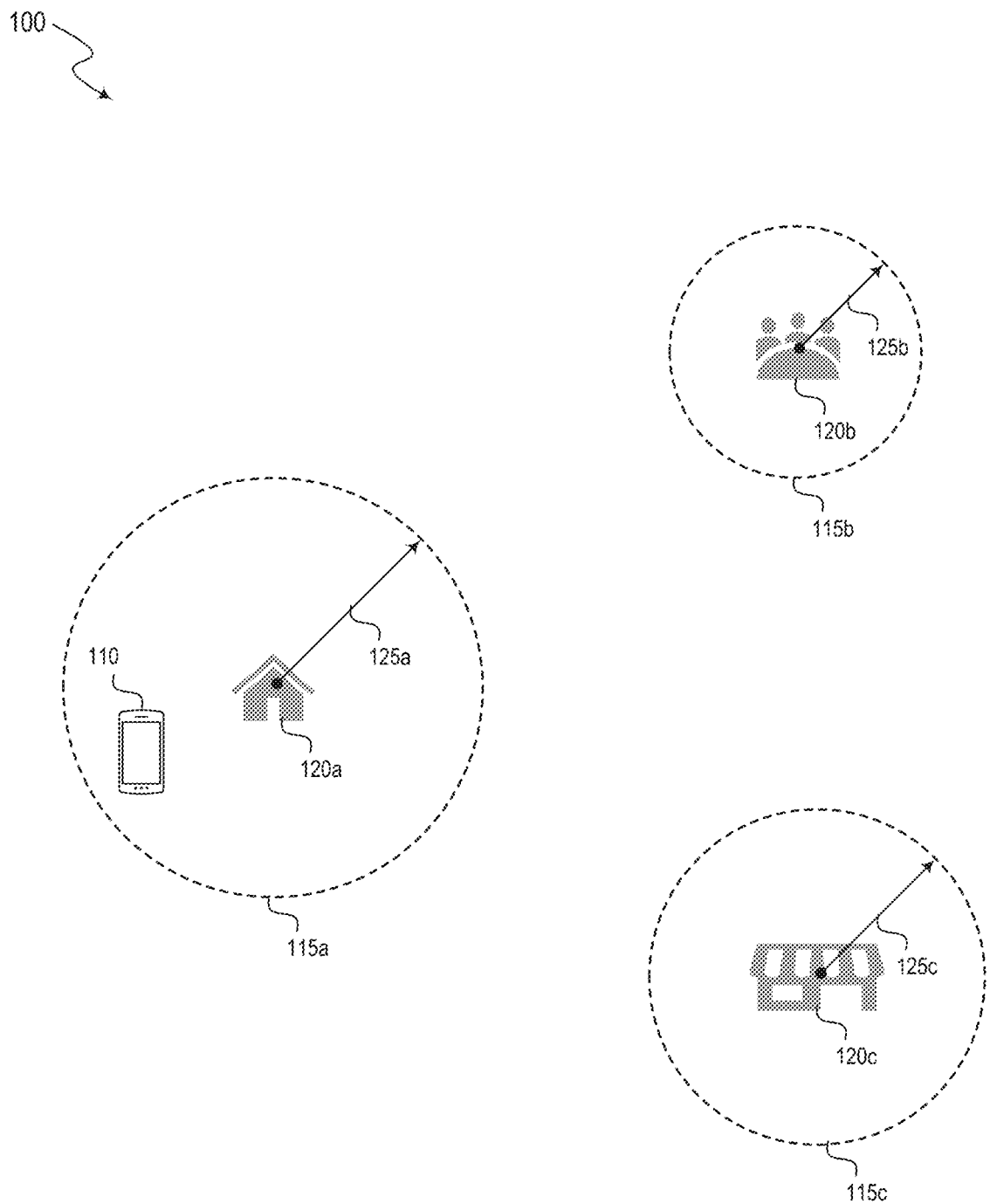
FIG. 1 is a schematic diagram illustrating various environments for organizing applications for mobile devices in accordance with embodiments of the present technology.

Mobile devices (e.g., cellular phones) are ubiquitous in contemporary lifestyle, assisting users in various business and/or personal settings. The mobile device typically includes many applications represented by graphical elements (e.g., icons) that are configured to activate corresponding applications when selected by the users. Such graphical elements may be distributed across multiple screens (e.g., their default locations to appear without the users' arrangements) of the mobile device, requiring the users to go through the screens searching for a certain application that they want to activate. Accordingly, the users may select and move several icons of useful applications to one or more convenient screens such that the icons (e.g., the graphical elements for the useful applications) are readily available. In some cases, however, locating certain icons in their default locations may not be intuitive or straightforward, and moving them to the convenient screens may be time-consuming and/or inefficient—e.g., to users with visual and/or physical challenges.

Moreover, the user's preferred collection and arrangement of icons may be lost (otherwise disturbed) following certain events for the mobile devices—e.g., after an update to an operating system is performed, after one or more new applications are downloaded and/or installed. Additionally, or alternatively, the users may find certain applications more useful than others depending on various situations, for example, whether the users are at work or at home, what the present time and/or date are, among others. As such, it would be beneficial for a user of a mobile device if the mobile device can identify, from a set of applications of the mobile device, a subset of applications that the user is likely to activate based on a particular environmental setting (e.g., at work in the morning on Tuesday, in a library in the afternoon on Saturday, etc.) and/or the user's history (or patterns) of accessing certain applications over others. Subsequently, the mobile device may organize and/or display icons corresponding to the subset of applications on a screen that appears when the user activates the mobile device, such that the user can conveniently find the icons.

In this regard, embodiments of the present technology facilitate a mobile device to determine an environmental setting in which the mobile device operates (e.g., the user's environment). Such an environmental setting may include a present geographic location (e.g., a location determined by a global positioning system (GPS) coupled with the mobile device), a present date and/or time, a present day (e.g., Monday through Sunday), or a combination thereof. The mobile device may identify a first subset of applications from the set of applications resident on the mobile device based on the environmental setting it has determined. For example, the mobile device may identify a calendar application, an email application, or the like, based on determining that the user is at work. In some cases, the mobile device may determine that the user is at work when the mobile device is in a first area including the user's workplace (e.g., a first reference location stored in the mobile device). In some cases, the mobile device may sort the applications based on frequencies of accessing the applications (e.g., quantities of activations made by the user during a predetermined duration), time periods the user utilizes the applications (e.g., lengths of the activations maintained by the user), or both, to identify the first subset of applications.

Subsequently, the mobile device can display, on a first screen of the mobile device, a first group of icons corresponding to the first subset of applications it has identified. The first screen may correspond to a screen that appears when the user activates the mobile device. In some cases, the mobile device enlarges at least one icon of the first group by a predetermined factor, prior to displaying it on the first screen such that the user may readily recognize the enlarged icon. Alternatively, the mobile device may provide a zoom feature for the user, by which the icon is enlarged after being displayed if the user chooses to adjust (e.g., enlarge, modify) a size of the icon. Such a predetermined factor may be based on the user's input and/or a quantity of enlarged icons to fit within the first screen. In some cases, the mobile device may move one or more icons of applications that the mobile device has determined as unlikely to be activated by the user, to a different screen of the mobile device (e.g., a second screen, a third screen, etc.).

In some embodiments, the mobile device may recognize a change in the environmental setting—e.g., the user leaving the workplace and approaching a health club, based on the GPS. When the mobile device is in a second area including the health club (e.g., a second reference location stored in the mobile device), the mobile device may identify a second subset of applications from the set of applications. In some cases, the applications of the second subset can include applications that the user may have activated when the user was in the second area. In this manner, the mobile device can identify one or more applications that the user is likely to activate—e.g., a workout application, an application for playing the user's favorite music, a running-distance application, or the like based on determining that the user approaches the health club. Subsequently, the mobile device may display a second group of icons corresponding to the second subset of applications on the first screen for the user, in lieu of the first group of icons (e.g., moving the first group of icons to a second screen).

In some embodiments, the mobile device may include an algorithm and/or a component (e.g., an algorithm to learn the user's pattern of using different applications based on different environmental settings and/or a processor performing the algorithm) that assists the mobile device to identify applications that the user is likely to activate. Such an algorithm may be based on an artificial intelligence (AI), a machine learning, and/or a deep learning utilizing neural networks, or the like. In some embodiments, the mobile device may respond to the user's voice command to arrange and display icons of the user's favorite applications on the first screen—e.g., "I am going to a gym. Show my gym apps." In some embodiments, the user may disable the mobile device's identifying applications and/or displaying icons of the identified applications based on determining various environmental settings and/or changes thereof.

Various environmental settings for organizing applications for mobile devices in accordance with embodiments of the present technology are illustrated in FIG. 1. Example screens of a mobile device displaying icons of certain applications in accordance with embodiments of the present technology are described with reference to FIG. 2. Detailed descriptions of the mobile device that supports organizing applications are provided with reference to FIG. 3. Flowcharts illustrating methods of organizing applications for mobile devices in accordance with embodiments of the present technology are described with reference to FIGS. 4 and 5.

FIG. 1 is a schematic diagram 100 illustrating various environmental settings for organizing applications for mobile devices in accordance with embodiments of the present technology. The schematic diagram 100 includes a mobile device 110 of a user and several geographic areas 115 (also identified individually as 115a through 115c) where the mobile device 110 (e.g., the user of mobile device 110) may be located. Individual areas 115 may include corresponding reference locations 120 (also identified individually as 120a through 120c), as well as radial distances 125 (also identified individually as 125a through 125c).

The user may store (or install) a set of applications in the mobile device 110. Individual applications of the set may correspond to graphical elements configured to permit access to the individual applications, respectively. Such graphical elements may be referred to as icons. Individual graphical elements may be of an approximately same size (e.g., a default size) occupying a predetermined area on a screen of the mobile device 110. The mobile device 110 may be configured to display multiple screens with one or more icons, including a first screen that appears when the user activates the mobile device 110. Moreover, the mobile device 110 may be configured to monitor and store the user's usage patterns and/or associated information related to the applications of the set, such as how often the user activates (e.g., accesses) the individual applications (e.g., quantities of activations during a period of time, frequencies of use), how long the user utilizes the individual applications (e.g., lengths of activations maintained by the user), locations of the mobile device 110 when the user activates the individual applications, dates and times of such activations, among others.

The mobile device 110 may be coupled with a GPS to determine its present geographical location. The user may also store one or more reference locations in the mobile device 110. The reference locations may include places where the user tends to visit frequently (e.g., a grocery store, a shopping mall, a library, a health club, etc.) and/or places where the user tends to stay for extended durations (e.g., home, workplace, etc.). As such, the mobile device 110 may estimate a distance between its present location with respect to the reference locations. Further, the mobile device 110 may determine whether the mobile device 110 (e.g., the user) is within one of the geographic areas 115 based on estimating the distance. For example, if the mobile device 110 estimates the distance between its present location and the reference location 120a (e.g., the user's home) is less than the radial distance 125a, the mobile device may determine that the mobile device 110 is in the area 115a—e.g., the user is at home. Similarly, the mobile device 110 may determine that the mobile device 110 is in the area 115b if the distance between its present location and the reference location 120b (e.g., the user's workplace) is less than the radial distance 125b—e.g., the user is at work.

In this manner, the mobile device 110 may determine an environmental setting in which the mobile device 110 operates. The environmental setting may include a present geographic location determined by the GPS (and/or areas with respect to reference locations stored in the mobile device 110), a present date and time (e.g., 8 PM on Jan. 30, 2020), a present day (e.g., Thursday), or a combination thereof. Further, the mobile device 110 may identify, from the set of applications resident on (e.g., installed or stored in) the mobile device, a subset of applications based on determining a particular environmental setting—e.g., the mobile device 110 in the area 115a (e.g., the user's home or vicinity of the user's home) on 8 PM, Thursday, Jan. 30, 2020. Thereafter, the mobile device 110 may display icons of the subset of applications on the first screen such that the user can conveniently access (or activate) one or more applications presented (displayed on the first screen) by the mobile device 110.

In some embodiments, the mobile device 110 may sort individual applications of the set based on quantities of activations made by the user during a predetermined duration, lengths of the activations maintained by the user, or both. In some cases, the predetermined duration is based on an input provided by the user to the mobile device 110. That is, the mobile device 110 may identify applications that the user has activated during a time period that the user specified—e.g., the past week, month, quarter, year, etc. In other cases, the predetermined duration may relate to a duration that the mobile device 110 may determine appropriate to use, e.g., based on the user's history of activating applications.

In some embodiments, the mobile device 110 may, when sorting the individual applications, assign a different weight to the quantities of activations when compared to that of the lengths of activations. In some cases, the mobile device 110 may exclude idle time periods from the lengths of activations—e.g., excluding time periods that the user left the applications idle after activating them. Additionally, or alternatively, the mobile device 110 may sort the applications according to the quantities of activations first and then the lengths of activations, or vice versa. Moreover, the mobile device 110 may prioritize, among the set of applications, certain applications which were activated when the mobile device 110 was within a certain area (e.g., in the area 115a), based on its current geographic location (e.g., the user's home, the reference location 120a). Additionally, or alternatively, the mobile device 110 may prioritize, among the set of applications, one or more applications based on comparing the current time and/or the day (e.g., 8 PM and/or Thursday) with those of previous activations of the applications by the user—e.g., using a time window (e.g., a two-hour time window including the current time) to identify applications that the user has activated between 7 PM and 9 PM.

After sorting the individual applications, the mobile device 110 may select a certain quantity of applications to include in the subset of applications. In some cases, the quantity of application of the subset may be determined by an input from the user—e.g., the user may specify the quantity, such as four (4), six (6), eight (8), or any quantity of his/her preference. In other cases, the mobile device 110 may determine the quantity based on a maximum quantity of icons that can be displayed within a single screen (e.g., the first screen). Thereafter, the mobile device 110 may display on the first screen of the mobile device 110, a group of graphical elements (e.g., icons) corresponding to the applications of the subset, where each graphical element in the group permits access to one of the applications of the subset. As described herein, the mobile device 110 identifies the subset of applications based on a particular environmental setting. Thus, the subset of applications may include different applications based on various environmental settings of the mobile device 110.

In some embodiments, when the quantity of applications of the subset is different (e.g., less or more) than a predetermined quantity that the mobile device 110 is configured to identify, the mobile device 110 may vary one or more parameters that the mobile device 110 utilizes to identify the applications to include in the subset—e.g., a radial distance, a time window, etc. Varying the parameters may be useful for the mobile device 110 to identify additional applications (or to eliminate certain applications) to include (or to exclude) in the subset of applications.

For example, the mobile device 110 may have identified three (3) applications using a first radial distance from the reference location 120a when the mobile device 110 is configured to identify four (4) or more applications—e.g., to display on the first screen. As such, the mobile device 110 may increase the radial distance to a second radial distance from the reference location 120a, which is greater than the first radial distance. By increasing the radial distance (e.g., by using the second radial distance to cover a greater area from the reference location), the mobile device 110 may identify a greater quantity of applications (e.g., four (4) or more) to include in the subset of applications. Additionally, or alternatively, the mobile device 110 may vary (e.g., increase) the time window to identify more applications to meet the predetermined quantity that the mobile device 110 is configured to identify. Similarly, the mobile device 110 may decrease the radial distance (and/or the time window) to reduce the quantity of applications the mobile device 110 has identified such that the mobile device 110 may satisfy the predetermined quantity to include in the subset of applications—e.g., to display on the first screen.

In some embodiments, the mobile device 110 may include an algorithm and/or a component (e.g., a processor) that facilitates the mobile device 110 to identify applications that the user is likely to activate under a certain environmental setting. Such an algorithm (or a component) may utilize an artificial intelligence, a machine learning, and/or a deep learning utilizing neural networks, or the like. For example, the algorithm (or the component) may learn the user's pattern of using (e.g., activating, accessing) different applications based on different environmental settings. Additionally, or alternatively, the algorithm may keep track of success rates (e.g., the user activating certain applications that the mobile device 110 displays on the first screen) and/or fail rates (e.g., the user omitting to activate certain applications that the mobile device 110 displays on the first screen), as well as parameters (and/or their priorities used in identifying certain applications) the mobile device 110 utilized in identifying the applications to include in the subset to display on the first screen—e.g., the radial distances, the time windows, the frequencies of activations, the lengths of activations, whether applications are activated or not when the mobile device 110 is in a particular area, the time and/or date of activations, etc.

Further, the algorithm (or the component) may determine that different parameters and/or priorities may be more (or less) useful in different environmental settings to improve the success rates. For example, the algorithm (or the component) may determine that utilizing the information related to the geographic location is efficient to improve the success rate for certain areas (e.g., what radial distance to use to identify applications of high success rate, an incremental distance to use when varying the radial distance to use, etc.) than utilizing the information related to the user's usage pattern based on a time window. In this manner, the algorithm (or the processor) may assist the mobile device 110 to make more intelligent identifications as to which applications the mobile device 110 may include in the subset of applications to display on the first screen.

In some embodiments, the mobile device 110 may determine one or more changes in the environmental settings—e.g., time of the day changed to 8 AM from 6 PM, the GPS indicating the user leaving work (e.g., the reference location 120b) and/or approaching a grocery store (e.g., the reference location 120c), etc. The mobile device 110 may identify a different subset of applications based on the changes in the environmental settings such that the first screen of the mobile device 110 may display icons corresponding to the different subset of applications pertinent to a new environmental setting.

By way of example, the mobile device 110 may determine that the mobile device 110 is at or approaching a first location based on the GPS—e.g., the user of mobile device 110 approaches or at his/her workplace (e.g., at the reference location 120b or a vicinity of the reference location 120b). The mobile device 110 may identify a first set of applications from a plurality of applications stored in the mobile device 110, where the first set of applications has been activated by the user when the mobile device 110 is in a first area (e.g., the area 115b) within a first radial distance (e.g., radial distance 125b) from a first reference location (e.g., the reference location 120b, the user's workplace) stored in the mobile device 110. Additionally, the mobile device 110 may identify a first subset of applications of the first set, where the first subset of applications has been activated by the user within a first time window (e.g., one (1) hour window) including a present time (e.g., 8 AM).

Further, the mobile device 110 may select one or more applications (e.g., a business email application, a calendar application for managing meetings at work, etc.) from the first subset of applications based on quantities of activations made by the user (e.g., during a predetermined duration in some cases) and/or lengths of the activations maintained by the user, as described above. Thereafter, the mobile device 110 may display on the first screen of the mobile device, one or more graphical elements (e.g., icons for the email application and/or the calendar application) corresponding to the one or more applications that have been selected.

Thereafter, the mobile device 110 may determine that the mobile device 110 is at or approaching a second location based on the GPS—e.g., the user of mobile device 110 approaches or at a grocery store (e.g., at the reference location 120c or a vicinity of the reference location 120c). The mobile device 110 may identify a second set of applications of the plurality, where the second set of applications has been activated by the user when the mobile device 110 is in a second area (e.g., the area 115c) within a second radial distance (e.g., radial distance 125c) from a second reference location (e.g., the reference location 120c, the grocery store) stored in the mobile device 110. Additionally, the mobile device 110 may identify a second subset of applications of the second set, where the second subset of applications has been activated by the user within a second time window (e.g., two (2) hour window) including a present time (e.g., 6 PM).

Further, the mobile device 110 may select one or more applications (e.g., a coupon application, a notepad application for grocery shopping lists) from the second subset of applications based on quantities of activations made by the user and/or lengths of the activations maintained by the user, as described above. Thereafter, the mobile device 110 may display on the first screen of the mobile device, one or more graphical elements (e.g., icons for the coupon application and/or the notepad application) corresponding to the one or more applications that have been selected. In this regard, the mobile device 110 may have moved the one or graphical elements that the first screen used to display when the user was at his/her workplace (e.g., the area 115b) to a second screen of the mobile device 110.

In this manner, the mobile device 110 may identify different subsets of applications based on changes in the environmental settings (e.g., the user coming to work in the morning, and then coming to a grocery store in the evening after work) such that the first screen of the mobile device 110 can display icons of the different subsets of applications pertinent to different environmental settings.

Although in the foregoing examples, the mobile device 110 has been described to identify the applications based on certain parameters in a certain sequence (e.g., a priority scheme), e.g., by using a GPS location of the mobile device 110 first, and then whether the user activated applications or not when the user was in an area including the GPS location, and then whether the user activated the applications within a particular time window, etc., in other embodiments, additional and/or alternative parameters could be used in different sequences (e.g., a different priority scheme) to refine (or identify) the applications to display in the first screen. For example, the mobile device 110 may sort individual applications of the plurality based on frequencies of activations regardless of the current location of the mobile device 110. Subsequently, the mobile device 110 may select applications from the sorted list of applications based on the current location of the mobile device 110. Additionally, or alternatively, the mobile device 110 may utilize the AI algorithm and/or the AI component described above to identify the applications (e.g., icons, graphical elements to display on the first screen)—e.g., based on the success rates that the mobile device 110 accumulates over time, based on learning the user's pattern of using various applications, which may be different in different environmental settings.

Figure 2:
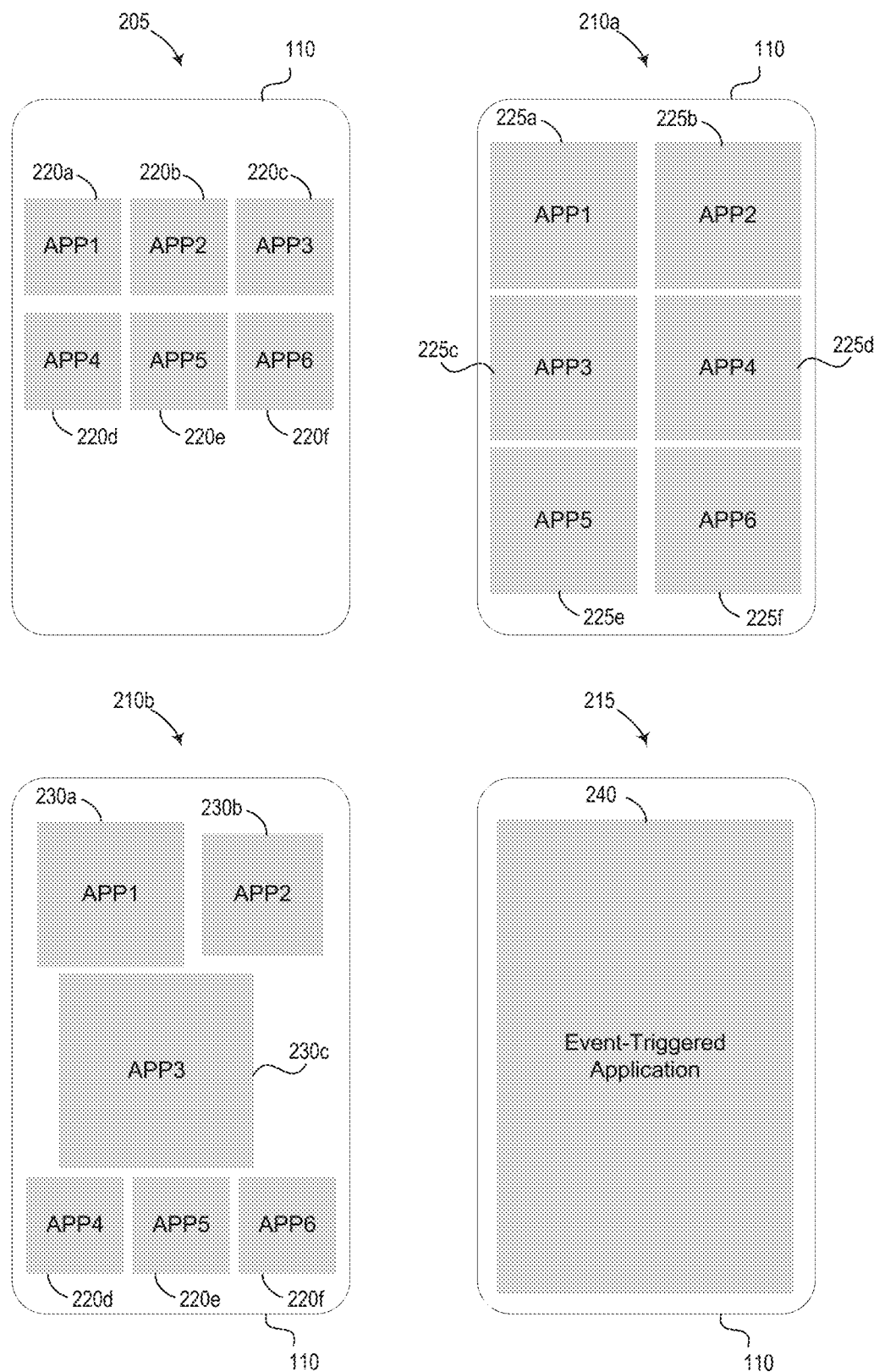
FIG. 2 illustrates example screens of a mobile device that supports organizing applications in accordance with embodiments of the present technology.

FIG. 2 illustrates example screens of the mobile device 110 that supports organizing applications in accordance with embodiments of the present technology. The example screens 205, 210a, 210b, and 215 may correspond to the first screen of the mobile device 110 described with reference to FIG. 1, namely, the screen that appears when the user activates the mobile device 110.

The screen 205 depict that the mobile device 110 may display a group of graphical elements 220 (also identified individually as 220a through 220f). The graphical elements 220 are configured to permit access to corresponding applications that the mobile device 110 has identified out of a set of applications stored in the mobile device 110, based on an environment setting as described with reference to FIG. 1. For example, the mobile device 110 may have identified six (6) applications (e.g., APP1 through APP6) based on a particular environmental setting, e.g., the mobile device 110 in the area 115a (e.g., the user's home) on 8 PM, Thursday, Jan. 30, 2020.

In some embodiments, the mobile device 110 positions the graphical elements 220 at locations that have been predetermined—e.g., positioning a first icon (e.g., the graphical element 220a) toward the top-left corner of the screen 205 if the mobile device 110 determines that a first application corresponding to the first icon is the application that the user is most likely to activate when the user is at home in the evening of workdays (e.g., Thursday). Similarly, the mobile device 110 may position a sixth icon (e.g., the graphical element 220f) toward the bottom-right corner of the screen 205 if the mobile device 110 determines that a sixth application corresponding to the sixth icon is the application that the user is least likely to activate, among the six applications that the mobile device 110 has identified. In some cases, such positioning may be based on inputs provided by the user. In some cases, the graphical elements 220 may be of the default size.

The screen 210a depicts that the mobile device 110 may enlarge, prior to displaying on the first screen, the graphical elements 220 of the group by a predetermined factor. In some cases, the enlarged graphical elements 225 (also identified individually as 225a through 225f) are greater in size than the default size—e.g., the default size of the graphical elements corresponding to applications that are not identified as likely to be activated by the user, the size of the graphical elements 220 displayed on the screen 205 in their default size. In some cases, the predetermined factor may be based on a quantity of enlarged graphical elements of the group that fits within the first screen—e.g., the six (6) enlarged graphical elements 225 as depicted in the screen 210a. In some cases, the predetermined factor may be based on an input provided by a user of the mobile device—e.g., the user may have weak eyesight and desire to have the graphical elements displayed in a larger size than the default size.

Although the screen 210a depicts all graphical elements are enlarged when compared to the graphical elements 220 of the screen 205, the present technology is not limited thereto. For example, the mobile device 110 may enlarge at least one graphical element (e.g., the graphical element 220a), and display an enlarged graphical element (e.g., the graphical element 225a) on the first screen. Thus, the mobile device 110 may display graphical elements that are different in size on a screen—e.g., some graphical elements displayed in the default size, while one or more graphical elements displayed in a size greater than the default size. Further, the screen 210a may include a different quantity of graphical elements than that of the screen 205 when the size of enlarged graphical elements may not fit all the graphical elements displayed on the screen 205 in their default size. For example, the screen 210a may include four (4) enlarged graphical elements (e.g., the graphical elements 225a through 225d), or two (2) enlarged graphical elements (e.g., the graphical elements 225a and 225b). In such cases, the mobile device 110 may choose applications to display using the enlarged graphical elements based on a likelihood of the user activating the applications.

Alternatively, the mobile device may provide a zoom feature such that the user may adjust sizes of one or more graphical elements displayed—e.g., the graphical elements 220a through 220f displayed on the screen 205. For example, the screen 210b may represent a screen after the user have selectively adjusted (e.g., enlarged) sizes of the one or more graphical elements using such a zoom feature. For example, the user may have enlarged the default size of the graphical elements 220a through 220c to generate graphical elements 230a through 230c, respectively. In some cases, some of the enlarged graphical elements 230 may be of the same size of the graphical elements 225a—e.g., the graphical element 230a may have the same size as the graphical element 225a if the user decides to use the predetermined factor to enlarge. As depicted in the screen 210b, the enlarged graphical elements 230 may have different sizes from each other—e.g., if the user decides to customize individual graphical elements differently. Further, the screen 210b may include a different quantity of graphical elements than the quantity of graphical elements originally displayed with the default size (e.g., six (6) graphical elements 220a through 220f on the screen 205). For example, the md 110 may move the graphical elements 220d through 220f to a different screen (e.g., a second screen, a third screen, etc.) to display the enlarged graphical elements 230 thereon.

In some embodiments, the mobile device 110 can be configured to identify one or more applications based on events that the user predetermined and stored in the mobile device 110. Such predetermined events may include birthdays of family members and/or friends, anniversaries, or any important events to the user. Further, the mobile device 110 may include the one or more applications associated with such predetermined events ("event-triggered applications") in the subset of applications that the mobile device 110 identified based on an environmental setting. In some cases, the mobile device 110 may identify the event-triggered applications by comparing the present date of the environment setting and the dates of the events. Accordingly, the graphical elements 220 of the screen 205 may include an event-triggered application (e.g., the graphical element 220d corresponding to one of the event-triggered applications).

The screen 215 depicts that the mobile device 110 may initiate the event-triggered application when certain criteria are satisfied. For example, the mobile device 110 may initiate the event-triggered application (e.g., a shopping application 240 including favorite stores of the user's spouse) when the user's wedding anniversary is one-week away from the present date. In some cases, the mobile device 110 may prompt the user, after displaying the group of graphical elements on the first screen (e.g., the graphical elements 220 displayed in the screen 205), whether to initiate the event-triggered application. For example, the mobile device 110 may display a message pertaining to activating the event-triggered application. In other examples, the mobile device 110 may highlight and/or enlarge the graphical element corresponding to the event-triggered application (e.g., the graphical element 220d).

Subsequently, the mobile device 110 may initiate the event-triggered application (e.g., the shopping application 240 including favorite stores of the user's spouse) based on receiving a confirmation to initiate the event-triggered application from the user.

Figure 3:
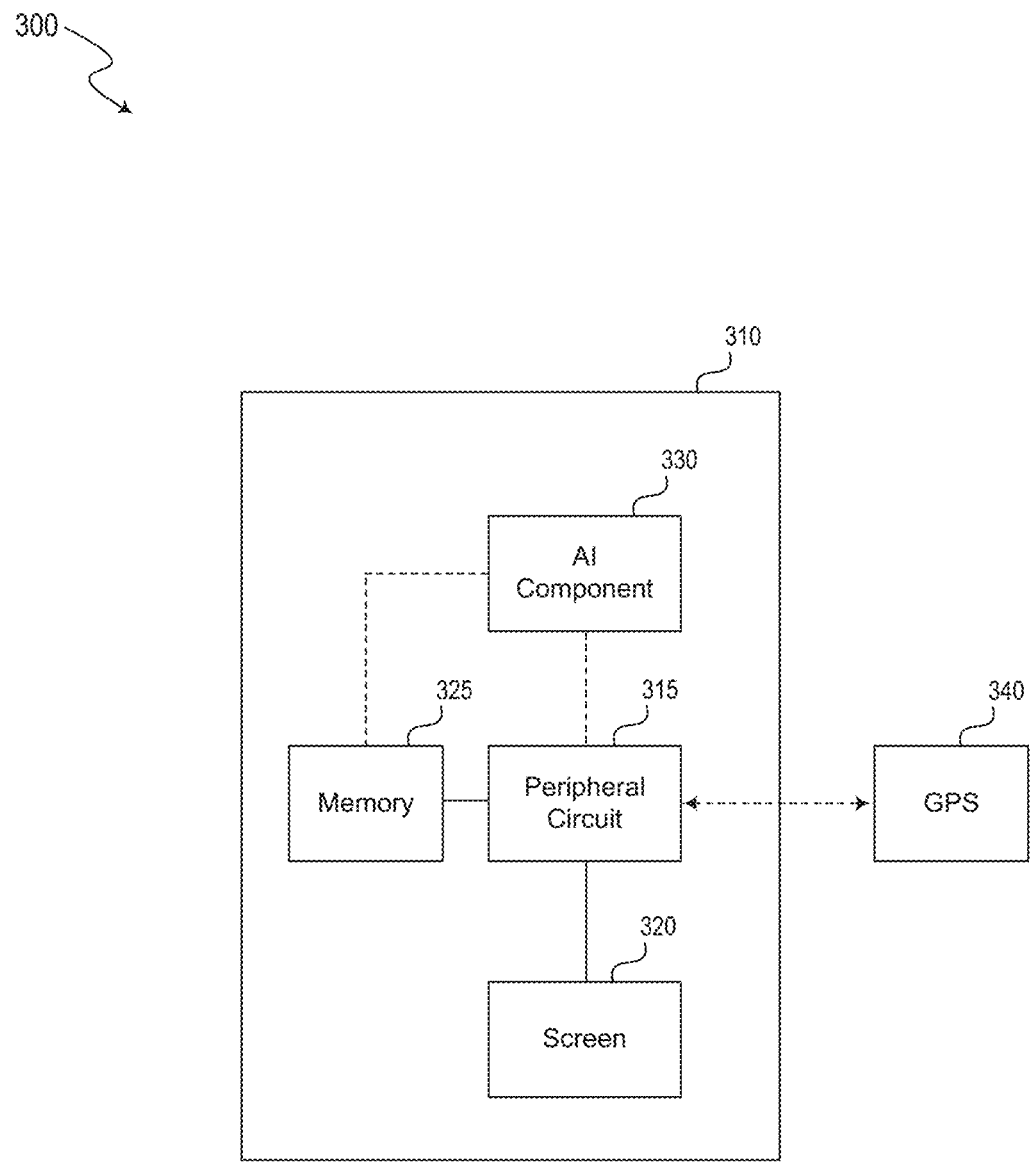
FIG. 3 is a block diagram of a mobile device that supports organizing applications in accordance with embodiments of the present technology.

FIG. 3 is a block diagram 300 of a mobile device 310 that supports organizing applications in accordance with embodiments of the present technology. The mobile device 310 may be an example of or include aspects of the mobile device 110 described with reference to FIGS. 1 and 2. The mobile device 310 may store a set of applications, as well as graphical elements corresponding to individual applications of the set. The mobile device 310 may include a peripheral circuit 315, a screen 320, and a memory 325. Further, the mobile device 310 may be coupled with a GPS 340. In some embodiments, the mobile device 310 includes an artificial intelligence (AI) component 330.

The screen 320 may be configured to perform various tasks related to interfacing with a user of the mobile device 310. The screen 320 may be configured to display multiple screens with various contents for the user. Further, the screen 320 may be configured to receive various inputs from the user based displaying the contents. In some embodiments, the screen 320 may display a first screen that appears when the user activates the mobile device 310, and alternatively other screens (e.g., a second screen, a third screen, or more). The screens 205, 210a, 210b, and 215 described with reference to FIG. 2 may be example screens that the screen 320 may display at a time.

The peripheral circuit 315 may be configured to determine an environmental setting in which the mobile device 310 operates. The environmental setting may include a present geographic location of the mobile device 310 (e.g., the user of the mobile device 310 determined by the GPS 340), a present date and time, a present day, or a combination thereof. The peripheral circuit 315 may identify, from the set of applications resident on the mobile device 310 (e.g., installed or stored in the mobile device 310), a subset of applications of the set based on the environmental setting as described with reference to FIGS. 1 and 2. Moreover, the peripheral circuit 315 may display on the first screen a group of graphical elements (e.g., icons) corresponding to applications of the subset, where each graphical element in the group permits access to one of the applications of the subset.

In some embodiments, the peripheral circuit 315 may enlarge, prior to displaying on the first screen, a first graphical element of the group by a predetermined factor, as described with reference to FIG. 2. The factor may be based on the user's input, in some cases. Additionally, or alternatively, the peripheral circuit 315 may determine the factor based on various aspects of contents to display on the first screen, such as a quantity of enlarged icons to fit in the first screen, or the like.

In some embodiments, the peripheral circuit 315 may monitor the user's activities associated with the set of applications, such as how often the user activates (e.g., accesses) the individual applications (e.g., quantities of activations during a period of time), how long the user uses the individual applications (e.g., lengths of activations maintained by the user), locations of the mobile device 110 when the user activates the individual applications, dates and times of such activations, among others. Further, peripheral circuit 315 may store information related to the user's activities in the memory 325, as well as other useful information for the peripheral circuit 315 to identify the applications of the subset, such as various reference locations (e.g., the reference locations 120a through 120c), events important to the user, which may trigger activating certain applications, among others. The peripheral circuit 315 may utilize the information stored in the memory 325 when identifying the subset of applications based on the environmental setting and/or initiating event-triggered applications, as described with reference to FIGS. 1 and 2. In some cases, the memory 325 may contain data related to the success (and/or fail) rates associated with the applications of the subset and/or certain parameters (and/or priorities among the parameters) that improve the success rates.

The AI component 330 may be configured to carry out an algorithm to learn the user's pattern of using different applications under different environmental settings. The AI component 330 may be based on a machine learning scheme, and/or include a deep learning component (e.g., a processor utilizing neural networks), or the like. The AI component 330 may assist the peripheral circuit 315 to identify applications that the user is likely to activate under a particular environmental setting. In some cases, the AI component 330 may determine what radial distances (and/or time windows) to use to identify the applications of the subset. In some cases, the AI component 330 may store and/or retrieve data related to the success rate (and/or fail rates) to assist the peripheral circuit 315 to make educated and/or intelligent determinations as to which applications the peripheral circuit 315 to include in the subset of applications to display on the first screen. In some embodiments, the AI component 330 may, in conjunction with the peripheral circuit 315, respond to the user's voice command to arrange and display icons of the user's favorite applications on the first screen—e.g., "I am going to a gym. Show my gym apps."

Figure 4:
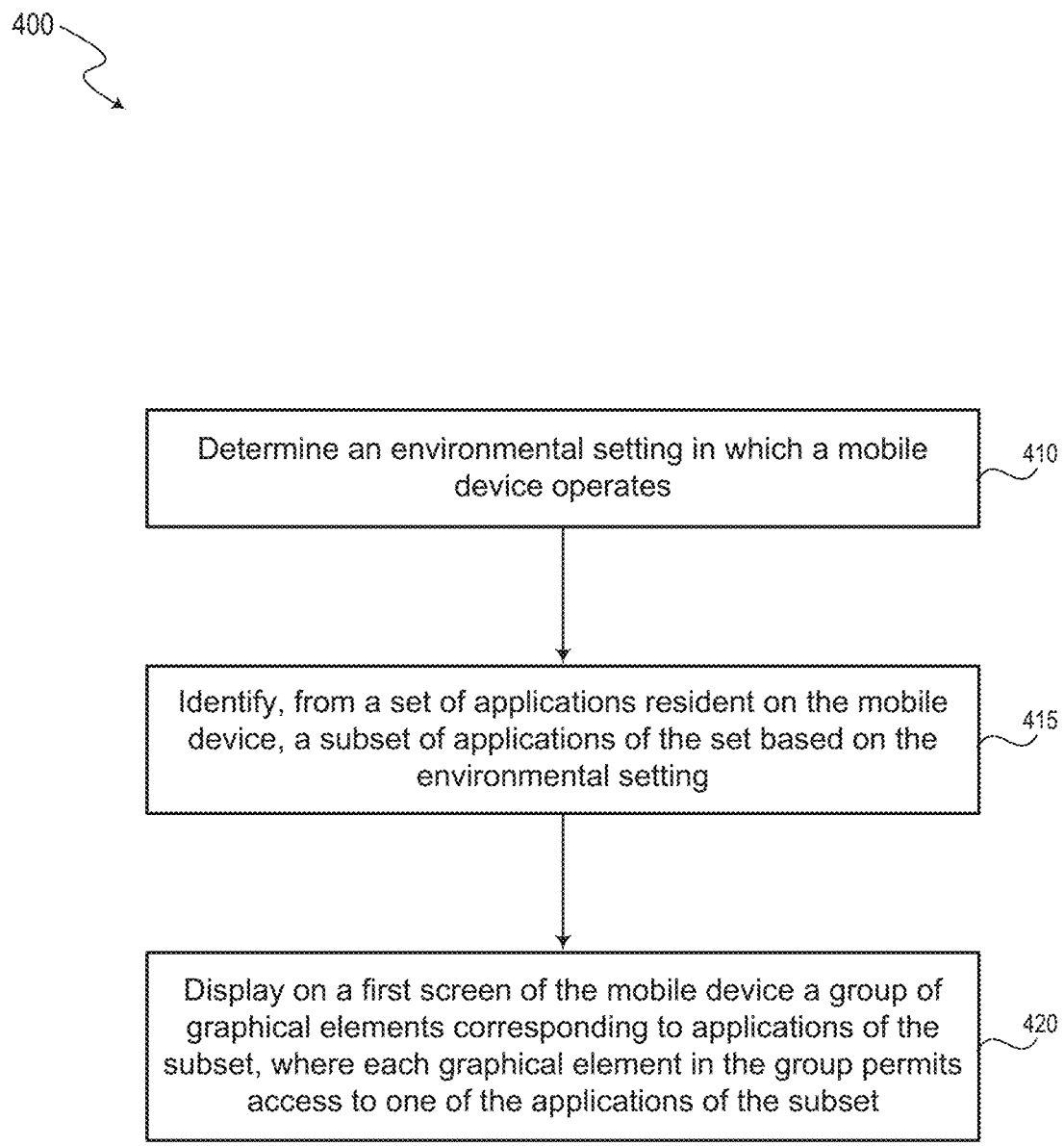
FIGS. 4 and 5 are flowcharts of methods of organizing applications for mobile devices in accordance with embodiments of the present technology.

FIG. 4 is a flowchart 400 illustrating a method of organizing applications for mobile devices in accordance with embodiments of the present technology. The flowchart 400 may be an example of or include aspects of a method that a mobile device (e.g., the mobile device 110, the mobile device 310) may perform as described with reference to FIGS. 1 through 3.

The method includes determining an environmental setting in which a mobile device operates (box 410). In accordance with one aspect of the present technology, the determining feature of box 410 can be performed by the mobile device, in conjunction with the peripheral circuit 315 in some cases, as described with reference to FIGS. 1 through 3.

The method further includes identifying, from a set of applications resident on the mobile device, a subset of applications of the set based on the environmental setting (box 415). In accordance with one aspect of the present technology, the identifying feature of box 415 can be performed by the mobile device, in conjunction with the peripheral circuit 315 in some cases, as described with reference to FIGS. 1 through 3.

The method further includes displaying on a first screen of the mobile device a group of graphical elements corresponding to applications of the subset, wherein each graphical element in the group permits access to one of the applications of the subset (box 420). In accordance with one aspect of the present technology, the displaying feature of box 420 can be performed by the mobile device, in conjunction with the peripheral circuit 315 and/or the screen 320 in some cases, as described with reference to FIGS. 1 through 3.

In some embodiments, displaying the group of graphical elements on the first screen comprises enlarging, prior to displaying on the first screen, a first graphical element of the group by a predetermined factor. In some embodiments, the first graphical element that has been enlarged comprises a first size greater than a second size of a second graphical element configured to permit access to an application of the set, where the subset of applications that has been identified does not include the application. In some embodiments, the predetermined factor is based on a quantity of enlarged graphical elements of the group that fits within the first screen. In some embodiments, the predetermined factor is based on an input provided by a user of the mobile device.

In some embodiments, the environmental setting comprises a present geographic location determined by a GPS coupled with the mobile device, a present date and time, a present day, or a combination thereof. In some embodiments, identifying the subset of applications comprises sorting individual applications of the set based on quantities of activations made by a user of the mobile device during a predetermined duration, lengths of the activations maintained by the user, or both. In some embodiments, the predetermined duration is based on an input provided by the user.

In some embodiments, displaying the group of graphical elements on the first screen comprises moving a graphical element configured to permit access to an application of the set from the first screen to a second screen of the mobile device, where the subset of applications that has been identified do not include the application. In some embodiments, the first screen corresponds to a screen that appears when a user of the mobile device activates the mobile device. In some embodiments, displaying the group of graphical elements on the first screen comprises positioning the graphical elements of the group at locations that have been predetermined based on input provided by a user of the mobile device.

In some embodiments, the method may further include initiating an event-triggered application that is associated with an event predetermined by a user of the mobile device, where the subset of applications includes the event-triggered application. In some embodiments, the method may further include prompting, after displaying the group of graphical elements on the first screen, the user whether to initiate the event-triggered application, and receiving, from the user, a confirmation to initiate the event-triggered application, where initiating the event-triggered application is based on receiving the confirmation.

Figure 5:
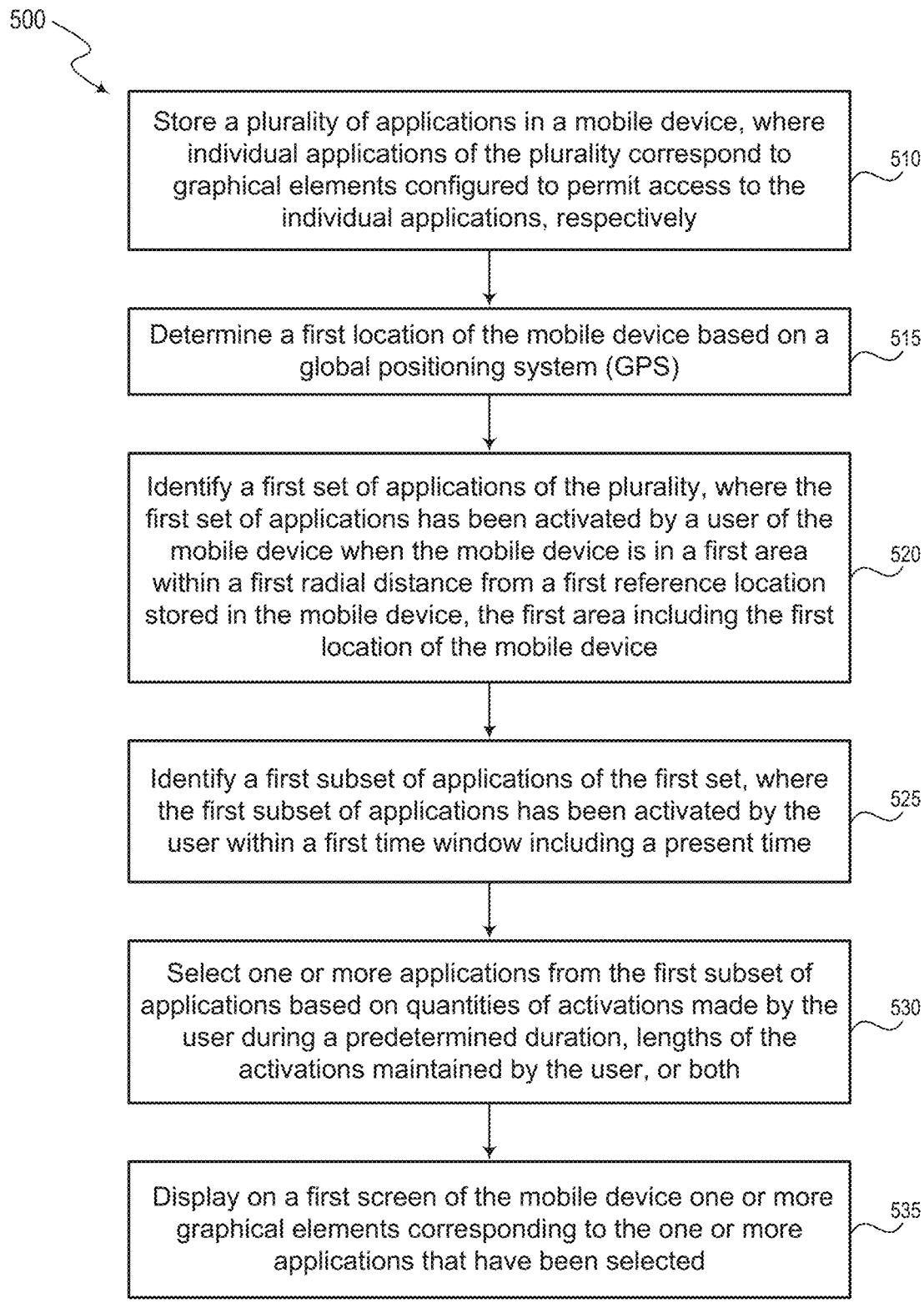

FIG. 5 is a flowchart 500 illustrating a method of organizing applications for mobile devices in accordance with embodiments of the present technology. The flowchart 500 may be an example of or include aspects of a method that a mobile device (e.g., the mobile device 110, the mobile device 310) may perform as described with reference to FIGS. 1 through 3.

The method includes storing a plurality of applications in a mobile device, where individual applications of the plurality correspond to graphical elements configured to permit access to the individual applications, respectively (box 510). In accordance with one aspect of the present technology, the providing feature of box 510 can be performed by the mobile device, in conjunction with the peripheral circuit 315 and/or the memory 325 in some cases, as described with reference to FIGS. 1 through 3.

The method further includes determining a first location of the mobile device based on a global positioning system (GPS) (box 515). In accordance with one aspect of the present technology, the displaying feature of box 515 can be performed by the mobile device, in conjunction with the peripheral circuit 315 in some cases, as described with reference to FIGS. 1 through 3.

The method further includes identifying a first set of applications of the plurality, where the first set of applications has been activated by a user of the mobile device when the mobile device is in a first area within a first radial distance from a first reference location stored in the mobile device, the first area including the first location of the mobile device (box 520). In accordance with one aspect of the present technology, the identifying feature of box 520 can be performed by the mobile device, in conjunction with the peripheral circuit 315 in some cases, as described with reference to FIGS. 1 through 3.

The method further includes identifying a first subset of applications of the first set, where the first subset of applications has been activated by the user within a first time window including a present time (box 525). In accordance with one aspect of the present technology, the identifying feature of box 525 can be performed by the mobile device, in conjunction with the peripheral circuit 315 in some cases, as described with reference to FIGS. 1 through 3.

The method further includes selecting one or more applications from the first subset of applications based on quantities of activations made by the user during a predetermined duration, lengths of the activations maintained by the user, or both (box 530). In accordance with one aspect of the present technology, the selecting feature of box 530 can be performed by the mobile device, in conjunction with the peripheral circuit 315 in some cases, as described with reference to FIGS. 1 through 3.

The method further includes displaying on a first screen of the mobile device, one or more graphical elements corresponding to the one or more applications that have been selected (box 535). In accordance with one aspect of the present technology, the displaying feature of box 535 can be performed by the mobile device, in conjunction with the peripheral circuit 315 and/or the screen 320 in some cases, as described with reference to FIGS. 1 through 3.

In some embodiments, the method may further include identifying a second set of applications of the plurality, where the second set of applications has been activated by the user when the mobile device is in a second area within a second radial distance from the first reference location, the second radial distance greater than the first radial distance, when the first set of applications includes a first quantity of applications less than a first predetermined quantity. In some embodiments, the method may further include identifying a second subset of applications of the first set, where the second subset of applications has been activated by the user within a second time window including the present time, the second time window greater than the first time window, when the first subset of applications includes a first quantity of applications less than a first predetermined quantity. In some embodiments, the method may further include determining a second location of the mobile device based on the GPS, and identifying a second set of applications of the plurality, where the second set of applications has been activated by the user when the mobile device is in a second area within a second radial distance from a second reference location stored in the mobile device, the second area including the second location of the mobile device.

It should be noted that the methods described above describe possible implementations, and that the operations and the steps may be rearranged or otherwise modified and that other implementations are possible. Furthermore, embodiments from two or more of the methods may be combined.

The functions described herein may be implemented in hardware, software executed by a processor, firmware, or any combination thereof. Other examples and implementations are within the scope of the disclosure and appended claims. Features implementing functions may also be physically located at various positions, including being distributed such that portions of functions are implemented at different physical locations.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing, it will be appreciated that specific embodiments of the invention have been described herein for purposes of illustration, but that various modifications may be made without deviating from the scope of the invention. Rather, in the foregoing description, numerous specific details are discussed to provide a thorough and enabling description for embodiments of the present technology. One skilled in the relevant art, however, will recognize that the disclosure can be practiced without one or more of the specific details. In other instances, well-known structures or operations often associated with memory systems and devices are not shown, or are not described in detail, to avoid obscuring other aspects of the technology. In general, it should be understood that various other devices, systems, and methods in addition to those specific embodiments disclosed herein may be within the scope of the present technology.

What is claimed is:

1. A method, comprising:
    storing a plurality of applications in a mobile device, wherein individual applications of the plurality correspond to graphical elements configured to permit access to the individual applications, respectively;
    determining a first location of the mobile device based on a global positioning system (GPS);
    identifying a first set of applications of the plurality, wherein the first set of applications has been activated by a user of the mobile device when the mobile device is in a first area within a first radial distance from a first reference location stored in the mobile device, the first area including the first location of the mobile device;
    identifying a first subset of applications of the first set, wherein the first subset of applications has been activated by the user within a first time window including a present time;
    selecting one or more applications from the first subset of applications based on quantities of activations made by the user during a predetermined duration, lengths of the activations maintained by the user, or both; and
    displaying on a first screen of the mobile device one or more graphical elements corresponding to the one or more applications that have been selected.

2. The method of claim 1, wherein displaying the one or more graphical elements on the first screen comprises:
    enlarging, prior to displaying on the first screen, a first graphical element of the one or more graphical elements by a predetermined factor.

3. The method of claim 2, wherein the first graphical element that has been enlarged comprises a first size greater than a second size of a second graphical element configured to permit access to an other application of the plurality of applications, wherein the one or more applications that have been selected does not include the other application.

4. The method of claim 2, wherein the predetermined factor is based on a quantity of enlarged graphical elements of the one or more graphical elements that fits within the first screen.

5. The method of claim 2, wherein the predetermined factor is based on an input provided by a user of the mobile device.

6. The method of claim 1, wherein the predetermined duration is based on an input provided by the user.

7. The method of claim 1, wherein displaying the one or more graphical elements on the first screen comprises:
moving a graphical element configured to permit access to an other application of the plurality of applications from the first screen to a second screen of the mobile device, wherein the one or more applications that have been selected do not include the other application.

8. The method of claim 1, wherein the first screen corresponds to a screen that appears when the user of the mobile device activates the mobile device.

9. The method of claim 1, further comprising:
initiating an event-triggered application that is associated with an event predetermined by the user of the mobile device, wherein the selected one or more applications includes the event-triggered application.

10. The method of claim 9, further comprising:
prompting, after displaying the one or more graphical elements on the first screen, the user whether to initiate the event-triggered application; and
receiving, from the user, a confirmation to initiate the event-triggered application, wherein initiating the event-triggered application is based on receiving the confirmation.

11. The method of claim 1, wherein displaying the one or more graphical elements on the first screen comprises:
positioning the one or more graphical elements at locations that have been predetermined based on input provided by the user of the mobile device.

12. The method of claim 1, further comprising:
identifying a second set of applications of the plurality, wherein the second set of applications has been activated by the user when the mobile device is in a second area within a second radial distance from the first reference location, the second radial distance greater than the first radial distance, when the first set of applications includes a first quantity of applications less than a predetermined quantity.

13. The method of claim 1, further comprising:
identifying a second subset of applications of the first set, wherein the second subset of applications has been activated by the user within a second time window including the present time, the second time window greater than the first time window, when the first subset of applications includes a first quantity of applications less than a predetermined quantity.

14. The method of claim 1, further comprising:
determining a second location of the mobile device based on the GPS;
identifying a second set of applications of the plurality, wherein the second set of applications has been activated by the user when the mobile device is in a second area within a second radial distance from a second reference location stored in the mobile device, the second area including the second location of the mobile device.

15. An apparatus, comprising:
a screen configured to display multiple screens including a first screen and a second screen; and
a peripheral circuit configured to:
store a plurality of applications in a mobile device, wherein individual applications of the plurality correspond to graphical elements configured to permit access to the individual applications, respectively;
determine a first location of the mobile device based on a global positioning system (GPS);
identify a first set of applications of the plurality, wherein the first set of applications has been activated by a user of the mobile device when the mobile device is in a first area within a first radial distance from a first reference location stored in the mobile device, the first area including the first location of the mobile device;
identify a first subset of applications of the first set, wherein the first subset of applications has been activated by the user within a first time window including a present time;
select one or more applications from the first subset of applications based on quantities of activations made by the user during a predetermined duration, lengths of the activations maintained by the user, or both; and
displaying on the first screen one or more graphical elements corresponding to the one or more applications that have been selected.

16. The apparatus of claim 15, wherein the peripheral circuit is further configured to:
enlarge, prior to displaying on the first screen, a first graphical element of the one or more graphical elements by a predetermined factor.

* * * * *